United States Patent Office 3,530,218
Patented Sept. 22, 1970

3,530,218
PESTICIDES
Arthur John Floyd, Bracknell, England, assignor to Imperial Chemical Industries Limited, London, England, a corporation of Great Britain
No Drawing. Continuation-in-part of application Ser. No. 301,604, Aug. 12, 1963. This application Feb. 1, 1965, Ser. No. 429,682
Claims priority, application Great Britain, Aug. 17, 1962, 31,698/62
Int. Cl. A01n 9/36
U.S. Cl. 424—203                  11 Claims

ABSTRACT OF THE DISCLOSURE

Process for destroying pests and pesticidal compositions useful therein, the pesticidal compound being of the formula:

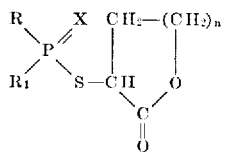

wherein X is sulphur, R is lower alkyl and $R_1$ is lower alkoxy and $n$ is an integer of from 1 to 3.

---

This application is a continuation-in-part of Ser. No. 301,604, filed Aug. 12, 1963.

This invention relates to new organo-phosphorus compounds having pesticidal activity, to processes of making them and to pesticidal compositions containing them.

According to the present invention there are provided new lactone compounds having the formula:

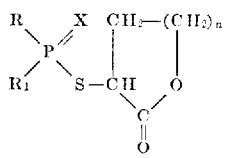

wherein R and $R_1$, which may be the same or different, represent alkyl, cyclo-alkyl, alkoxy, alkylmercapto, alkylamino or dialkylamino groups; X is an atom of oxygen or sulphur, and $n$ is an integer of from 1 to 3. The numbers of carbon atoms in the groups R and $R_1$ may vary considerably. Thus they may contain from 1 to 10 carbon atoms, although smaller groups containing from 1 to 6 carbon atoms are preferred. The lactone ring may contain 5, 6 or 7 atoms in the ring depending upon whether $n$ has a value of 1, 2 or 3. Preferred compounds include more specifically those wherein R is an alkyl group containing from 1 to 3 carbon atoms, $R_1$ is an alkoxy group containing from 1 to 6 carbon atoms and X is an atom of sulphur. When R and $R_1$ are both alkyl groups they contain preferably from 1 to 4 carbon atoms and when R and $R_1$ are both alkoxy groups they contain preferably from 1 to 6 carbon atoms.

The compounds may be prepared by a number of different methods. For example a phosphorus thiolic acid having groups R, $R_1$ and X attached to the phosphorus atom of the acid may be brought into reaction with a lactone having a replaceable halogen atom attached to the α carbon atom of the lactone ring under conditions whereby hydrogen halide which is formed in the reaction is removed as it is produced. This may be achieved by blowing an inert gas, for example nitrogen gas, through the reaction mixture or by carrying out the reaction in the presence of an acid acceptor, for example calcium carbonate, sodium carbonate or sodium acetate. An alternative method comprises bringing a salt of the thiolic acid into reaction with the halo-lactone. Suitable salts include alkali metal, especially sodium salts, although ammonium salts and salts of tertiary amines may also be used. The salts may be prepared separately or formed in situ by treating the thiolic acid with a suitable base before adding the halo-lactone. Lactones containing an atom of bromine as the replaceable halogen atom are especially convenient to use although chloro-lactones are more satisfactory for commercial purposes because the resulting compounds are cheaper to prepare. A further process which may be used compises bringing into reaction a thiol derivative of the lactone with a suitable pentavalent phosphorus monohalidate. The reaction may be carried out in the presence either of water or an organic solvent, for example diethyl ether, benzene or toluene. The use of alcohols as solvents is possible but they are better avoided because of their liability to enter into side reactions with the compounds. The reaction may be effected at temperatures which can vary widely. In general slightly elevated temperatures are preferred, for example from 40°–80° C. The compounds are usually oils which may be extracted from the reaction mixture by conventional techniques. Thus if the reaction is carried out in an aqueous medium the reaction mixture may be extracted with a water-insoluble solvent which is more volatile than the compound, separating the solution from the reaction mixture and then separating the solvent from the dissolved compound by distillation. When the reaction is carried out in the presence of a solvent insoluble in water the reaction mixture may be washed with an aqueous solution of sodium bicarbonate, filtered and the product obtained from the solvent in the manner described above. Since the compounds are usually oils which decompose when heated to their boiling points they are identified conveniently by chemical, including physico-chemical, methods of analysis, for example infrared spectra measurements, gas chromatography and measurements of refractive indices.

The compounds exert considerable toxicity towards a wide variety of insect pests including mosquito larva (*Aedes aegypti*), black aphids (*Aphis fabae*), green aphids (*Macrosiphum pisi*), red spider mite (*Tetranychus telarious*), cotton stainer capsid (*Dysdercus fasciatus*), diamond back moth caterpillar (*Plutella maculipennis*), grain weevil (*Calandra granaria*), mustard beetle (*Phaedon cochleariae*) and the common housefly (*Musca domestica*). Apart from their mammalian toxicity which is appreciably lower than that of conventional organo-phosphorus pesticides, the present compounds also have the advantages of acting as systemic pesticides which are absorbed by the roots of the host plant and destroy pests feeding upon the leaves or other parts of the plant. A further advantage of certain of the compounds resides in the fact that they exert a translaminar effect that is to say when applied to the upper surface of a leaf of a host plant they will penetrate the leaf and kill a pest feeding on its undersurface. A further advantage of some of the present compounds is that in contrast to certain conventional organo-phosphorus pesticides they have a high activity against various forms of caterpillar pests.

The compounds are preferably converted into formulations to assist in their application. For example they may be used in the form of a powdery composition in which a minor amount of the compound is in admixture with a major amount of a solid diluent.

Suitable diluents include powdered kaolin, fuller's earth, gypsum, chalk, Hewitt's earth and China clay. Since a substantial number of the compounds are liquid at ordinary temperatures they are usually applied more conveniently in the form of a liquid preparation which is generally an aqueous dispersion or emulsion containing a surface active agent, for example a wetting or dispersing agent. Suitable surface active agents include condensation products of ethylene oxide with various substances, for example with alkylated phenols including octyl phenol and nonyl phenol, sorbitan monolaurate, oleyl alcohol, cetyl alcohol and propylene oxide polymer. Other agents which are also suitable include calcium dodecyl benzene sulphonate, sodium dodecyl benzene sulphonate, butyl naphthalene sulphonate, calcium lignosulphonate, sodium lignosulphonate, ammonium lignosulphonate and glue. An alternative method of making liquid preparations comprises dissolving the compounds in an organic solvent, for example benzene, methanol, ethanol or acetone, and then agitating the solutions with water containing the surface active agent.

The compounds are conveniently made available by a supplier in the form of a concentrate which is a composition containing a high proportion of the compound and which therefore is generally required to be diluted, usually with water, before application. The concentrate may contain from 10–85% by weight of the compound although for practical purposes from 25–60% by weight is usually preferred. An especially satisfactory form of concentrate is a dispersible oil which comprises a concentrated solution of the compound in an organic solvent containing a surface active agent which is soluble in the solvent and these oils form aqueous dispersions of the compound when diluted with water prior to application. The diluted preparations which are suitable for application may contain amounts of the compound which can vary widely although good results are usually obtainable by using from 0.02–0.2% by weight of the preparation. The latter may be applied by conventional methods, for example by dusting or spraying, depending upon whether the composition is a solid or a liquid.

This invention is illustrated by the following examples:

EXAMPLE 1

This example describes the preparation of α-(diethoxyphosphinothioylthio)-γ-butyrolactone.

O,O-diethyl phosphorodithioic acid (3.16 g.) was converted into a sodium salt by addition as drops to a reaction product of sodium (0.37 g.) and absolute ethanol (30 ml.) after which α-bromo-γ-butyrolactone (2.75 g.) was added. The resulting mixture was then heated to 70° C. At the end of that time the liquid reaction product was cooled and was decanted from the small amount of solid which had precipitated. The ethanol was removed from the liquid product by distillation in vacuo and the residue was extracted with ether (150 ml.). The ethereal solution was washed with three successive 10 ml. portions of water, dried over anhydrous magnesium sulphate and the ether was removed by distillation in vacuo. The residual oil was distilled to a pot temperature of 105° C. at 0.005 mm. of mercury, when there remained α-(diethoxyphosphinothioylthio)-γ-butyrolactone as a yellow oil having a refractive index of $n_D^{14}$ 1.5302.

EXAMPLE 2

This example describes the preparation of α-(-dimethylamino-(ethoxy)phosphinothioylthio) - γ - butyrolactone from a thiol derivative of a lactone.

α-Mercapto-γ-butyrolactone (5 g.) was added to a reaction product of sodium (1 g.) and ethanol (25 ml.) and the mixture diluted with benzene (100 ml.). O-ethyl N,N-dimethylphosphoramido-chloridothionate (7 g.) was then added gradually after which the reaction mixture was heated to 70° C. for 30 minutes, cooled and washed with an aqueous solution of sodium bicarbonate. The benzene layer was separated, dried with sodium sulphate, filtered and the benzene removed by distillation. The residue was then heated to 100° C. under reduced pressure (0.1 mm. of mercury). (Dimethylamino(ethoxy)phosphinylthioylthio)-γ-butyrolactone (2 g.) was obtained as a yellow oil having a refractive index of $n_D^{24}$ 1.5230.

EXAMPLE 3

This example describes the preparation of α-(methoxy(methyl) phosphinothioylthio)-γ-butyrolactone. The sodium salt of O-methyl methylphosphonodithioic acid (8.2 g.) was suspended in benzene (100 ml.) and treated with α-bromo-γ-butyrolactone (8.3 g.). The mixture was heated to 70° C. for 30 minutes, cooled and washed with an aqueous solution of sodium bicarbonate. The organic layer was separated, dried with sodium sulphate, filtered and the benzene removed by distillation. The residue was then heated to 100° C. under reduced pressure (0.1 mm. of mercury).

α-(Methoxy(methyl)phosphinothioylthio) - γ - butyrolactone (10 g.) was obtained as a yellow oil having a refractive index of $n_D^{20}$ 1.5456.

The following compounds were obtained using either of the methods described in Examples 2 and 3 using either an α-thiol derivative of the lactone or α-bromo-γ-butyrolactone and the appropriate phosphorus halidate or phosphorus thiolic acid. To simplify the description of each of the compounds obtained reference may be made to the following formula which is possessed by each of them:

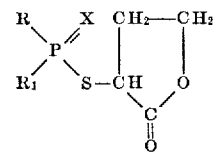

wherein R and $R_1$ and X have the meanings given below:

| Ex. | R | R¹ | X | Refractive Index |
|---|---|---|---|---|
| 4 | methyl | methoxy | S | $n_D^{20}$ 1.5456 |
| 5 | methyl | ethoxy | O | $n_D^{20}$ 1.4852 |
| 6 | methyl | ethoxy | S | $n_D^{20}$ 1.5577 |
| 7 | methyl | n-propoxy | S | $n_D^{23}$ 1.5470 |
| 8 | methyl | isopropoxy | S | $n_D^{23}$ 1.5435 |
| 9 | methyl | n-butoxy | S | $n_D^{20}$ 1.5462 |
| 10 | methyl | isobutoxy | S | $n_D^{23}$ 1.5372 |
| 11 | methyl | sec-butoxy | S | $n_D^{23}$ 1.5399 |
| 12 | methyl | n-pentyloxy | S | $n_D^{20}$ 1.5325 |
| 13 | methyl | isopentyloxy | S | $n_D^{20}$ 1.5215 |
| 14 | methyl | cyclopentyloxy | S | $n_D^{25}$ 1.5592 |
| 15 | methyl | neopentyloxy | S | $n_D^{20}$ 1.5335 |
| 16 | methyl | 1-methylbutoxy | S | $n_D^{20}$ 1.5348 |
| 17 | methyl | 1-ethylpropoxy | S | $n_D^{21}$ 1.5382 |
| 18 | methyl | n-hexyloxy | S | $n_D^{20}$ 1.5192 |
| 19 | methyl | cyclohexyloxy | S | $n_D^{19}$ 1.5575 |
| 20 | methyl | isohexyloxy | S | $n_D^{19}$ 1.5295 |
| 21 | methyl | n-decyloxy | S | $n_D^{19}$ 1.5064 |
| 22 | methyl | ethymercapto | S | $n_D^{24}$ 1.5950 |
| 23 | methyl | isopropylmercapto | S | $n_D^{27}$ 1.5529 |
| 24 | methyl | butylmercapto | S | $n_D^{27}$ 1.5961 |
| 25 | ethyl | isopropylmercapto | S | $n_D^{27}$ 1.5566 |
| 26 | ethyl | methoxy | S | $n_D^{25}$ 1.5543 |
| 27 | ethyl | ethoxy | S | $n_D^{25}$ 1.5472 |
| 28 | ethyl | isopropoxy | S | $n_D^{23}$ 1.5317 |
| 9 | ethyl | n-butoxy | S | $n_D^{23}$ 1.5281 |
| 0 | isopropyl | ethoxy | S | $n_D^{22}$ 1.5231 |
| 21 | n-butyl | ethoxy | S | $n_D^{23}$ 1.5250 |
| 32 | methoxy | methoxy | S | $n_D^{20}$ 1.5432 |
| 33 | ethoxy | ethoxy | O | $n_D^{20}$ 1.4860 |
| 34 | isopropoxy | isopropoxy | S | $n_D^{19}$ 1.5159 |
| 35 | dimethylamino | dimethylamino | S | $n_D^{21}$ 1.5323 |

EXAMPLE 36

This example describes the preparation of α-(n-butoxy-(methyl)phosphinothioylthio)-δ-valerolactone. The sodium salt of N-butoxy(methyl)phosphinodithioc acid (4.8 g.) was suspended in benzene (100 ml.) and treated with α-bromo-δ-valerolactone (4.1 g.). The mixture was heated under reflux for 30 minutes after which it was cooled and washed with an aqueous solution of sodium bicarbonate. The upper solvent layer containing the required product was separated, dried with sodium sulphate and the solvent removed by distillation. The required product (3.2 g.) was obtained as an oil having a refractive index $n_D^{21}$ 1.5465

The process described in Example 36 was modified to enable the preparation of the following new compounds having the formula:

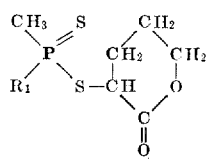

wherein $R_1$ has the meanings given below:

| Example | $R_1$ | Refractive Index |
|---|---|---|
| 37 | methoxy | $n_D^{23}$ 1.5735 |
| 38 | ethoxy | $n_D^{24}$ 1.5573 |
| 39 | n-propoxy | $n_D^{25}$ 1.5512 |
| 40 | isobutoxy | $n_D^{18}$ 1.5462 |
| 41 | sec-butoxy | $n_D^{23}$ 1.5462 |

The process of Example 36 was modified to enable the preparation of the new compounds containing an ε-lactone ring. Each of the compounds have the formula:

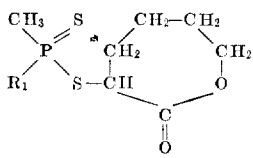

wherein $R_1$ is as shown below:

| Example | $R_1$ | Refractive Index |
|---|---|---|
| 42 | n-propoxy | $n_D^{22}$ 1.5419 |
| 43 | isopropoxy | $n_D^{22}$ 1.5414 |
| 44 | n-butoxy | $n_D^{22}$ 1.5360 |
| 45 | isobutoxy | $n_D^{22}$ 1.5358 |
| 46 | sec-butoxy | $n_D^{22}$ 1.5370 |
| 47 | isopentyloxy | $n_D^{22}$ 1.5360 |
| 48 | isohexyloxy | $n_D^{22}$ 1.5369 |
| 49 | cyclopentyloxy | $n_D^{25}$ 1.5455 |

EXAMPLE 50

This example illustrates a concentrate comprising a dispersible oil which is readily convertible by dilution with water into a liquid preparation suitable for spraying purposes. The concentrate has the following compositon:

|   | Percent wt. |
|---|---|
| Compound of Example 9 | 25.0 |
| "Lubrol" L (alkyl phenol/ethylene oxide condensate) | 2.5 |
| Calcium dodecyl benzene sulphonate | 2.5 |
| "Aromasol" H (alkyl benzene solvent) | 70.0 |

A very satisfactory concentrate containing the same organo-phosphorus compound comprises 50% by weight of compound and 50% by weight of Pluronic L.62 which is believed to be a condensation product of ethylene oxide and propylene oxide polymer.

EXAMPLE 51

This example illustrates a concentrate which is also in the form of dispersible oil. The composition of this concentrate is as follows:

|   | Percent wt. |
|---|---|
| Compound of Example 14 | 25.0 |
| "Lubrol" L | 4.0 |
| Calcium dodecyl benzene sulphonate | 6.0 |
| "Aromasol" H | 65.0 |

Alternative forms of this concentrate includes the use of 45% by weight of "Aromasol" H and 20% either of mineral oil or soya bean oil.

EXAMPLE 52

This example illustrates a wettable powder having the following composition:

|   | Percent wt. |
|---|---|
| Compound of Example 19 | 25.0 |
| Sodium silicate | 5.0 |
| Calcium lignosulphonate | 5.0 |
| China clay | 65.0 |

EXAMPLE 53

This example illustrates an atomisable fluid which in effect uses both a solvent and air or gas as a diluent. The fluid comprises a mixture consisting of 25% by weight of the compound of Example 1 and 75% by weight of xylene.

EXAMPLE 54

This example illustrates a dusting powder which may be applied directly to plants or other surfaces and comprises a mixture of 1% by weight of the compound of Example 22 and 99% by weight of talc.

EXAMPLE 55

This example illustrates aqueous dispersions of a number of the present compounds and their activity against various insect pests. The dispersions were prepared by dissolving each of the compounds listed below in the table in a solvent comprising 4 parts by volume of acetone and 1 part by volume of diacetone alcohol. The solutions were then diluted with water containing 0.01% by weight of a surface active agent sold under the trade name "Lissapol" NX ("Lissapol" being a registered trademark) until dispersions were formed which contained 0.1% by weight of the compounds.

The test procedure adopted with regard to each test insect was basically the same and comprised supporting a number of the insects on some medium which may be a host plant or some foodstuff on which the insect feeds, and treating either or both the insects and the medium with the dispersions.

The mortality of the insects was then assessed at periods usually varying from one to three days after the treatment.

The results of the tests are given in the table. In this table the first column indicates the compound used. Each of the subsequent columns indicates the name of the test insect, the host plant or medium on which the insects were supported and the number of days which were allowed to elapse after the treatment before assessing as a percentage the number of insects which had been killed. The assessment is expressed in integers which range from 0–3.

0 represents less than 30% kill
1 represents from 30–49% kill
2 represents from 50–90% kill
3 represents over 90% kill

| Compound of Example | Black aphid / Broad bean / 2 days | Green aphid / Broad bean / 2 days | Red spider mite / French bean / 3 days | Cotton stainer capsid / Cotton plant / 3 days | Diamond back moth caterpillar / Cabbage leaf / 2 days | Grain weevil / Wheat grain / 3 days | Mustard beetle / Mustard leaf / 2 days | Housefly / Malt-sugar/cotton wool / 1 day |
|---|---|---|---|---|---|---|---|---|
| 1 | 3 | 3 | 3 | 3 | 3 | 2 | 3 | 3 |
| 2 | 3 | 3 | 3 | 3 | 3 | 0 | 3 | 3 |
| 8 | 3 | 3 | 3 | 3 | 3 | 2 | 3 | 3 |
| 9 | 3 | 3 | 3 | 3 | 3 | 3 | 3 | 3 |
| 13 | 3 | 3 | 3 | 3 | 3 | 3 | 3 | 3 |
| 14 | 3 | 3 | 3 | 3 | 3 | 3 | 3 | 3 |
| 17 | 3 | 3 | 3 | 3 | 3 | 3 | 3 | 3 |
| 19 | 3 | 3 | 3 | 3 | 3 | 3 | 3 | 3 |
| 20 | 3 | 3 | 3 | 3 | 3 | 3 | 3 | 3 |
| 22 | 3 | 3 | 3 | 2 | 3 | 3 | 0 | 0 |
| 36 | 3 | 3 | -- | 3 | 3 | -- | -- | 2 |
| 37 | 3 | 3 | -- | 3 | 0 | -- | -- | 2 |
| 38 | 3 | 3 | -- | 3 | 3 | 3 | 3 | 2 |
| 42 | 3 | 3 | -- | 3 | 3 | 3 | 3 | 3 |
| 45 | 3 | 3 | -- | 3 | 3 | 3 | 3 | 3 |

What I claim is:

1. A pesticidal composition comprising a mixture of an effective amount of a compound of the formula

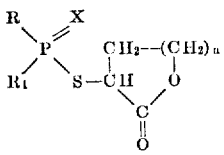

wherein X is sulphur, R is lower alkyl and $R_1$ is lower alkoxy and $n$ is an integer of from 1 to 3, and a surface active agent.

2. A pesticidal composition comprising a mixture of an effective amount of a compound of the formula

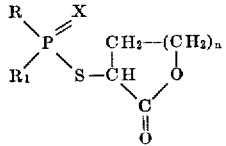

wherein X is sulphur, R is lower alkyl and $R_1$ is lower alkoxy and $n$ is an integer of from 1 to 3, and a major amount of a solid diluent therefor.

3. A concentrated pesticidal composition according to claim 1 containing 25–60% by weight of the lactone compound.

4. A pesticidal composition according to claim 1 containing an organic solvent for the lactone compound.

5. A pesticidal composition comprising an aqueous dispersion containing 0.2 to 2.0% by weight of a lactone compound of the formula

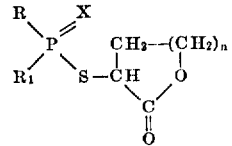

wherein X is sulphur, R is lower alkyl and $R_1$ is lower alkoxy and $n$ is an integer of from 1 to 3 dispersed in water in the presence of a surface active agent.

6. A process of destroying pests comprising treating the pests and pest habitat with a compound of the formula

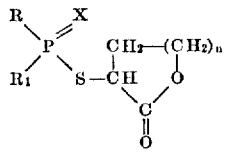

wherein X is sulphur, R is lower alkyl and $R_1$ is lower alkoxy and $n$ is an integer of from 1 to 3.

7. The process of claim 6 wherein the compound is one where R is alkyl of from 1 to 3 carbon atoms; $R_1$ is alkoxy of from 1 to 6 carbon atoms; and $n$ is 1.

8. The process of claim 7 wherein the R and $R_1$ substituents of said compound are methyl and n-butoxy, respectively.

9. A composition according to claim 1 wherein said compound is one in which R is alkyl of from 1 to 3 carbon atoms; $R_1$ is alkoxy of from 1 to 6 carbon atoms; and $n$ is 1.

10. A composition according to claim 9 wherein R is methyl and $R_1$ is n-butoxy.

11. A composition according to claim 2 wherein said compound is one in which R is alkyl of from 1 to 3 carbon atoms; $R_1$ is alkoxy of from 1 to 6 carbon atoms; and $n$ is 1.

References Cited

UNITED STATES PATENTS

| | | | |
|---|---|---|---|
| 2,974,084 | 3/1961 | Mayhew et al. | 167—33 |
| 2,995,576 | 8/1961 | Kagan et al. | 260—343.6 |
| 2,997,482 | 8/1961 | Craven | 260—343.5 |
| 3,086,907 | 4/1963 | Hessel | 167—33 |
| 3,413,318 | 11/1968 | Baker | 260—343.6 |
| 3,432,599 | 3/1969 | Hackmann | 424—203 |

OTHER REFERENCES

Derwent: Belgian patent report No. 95A, sect. 5—Gen'l org., page 2 ( Belg. 616, 760) (Apr. 20, 1962).

SHEP K. ROSE, Primary Examiner

U.S. Cl. X.R.

260—343.2, 343.5, 343.6